(12) United States Patent
Steelberg et al.

(10) Patent No.: US 8,751,479 B2
(45) Date of Patent: Jun. 10, 2014

(54) SEARCH AND STORAGE ENGINE HAVING VARIABLE INDEXING FOR INFORMATION ASSOCIATIONS

(75) Inventors: Ryan Steelberg, Irvine, CA (US); Chad Steelberg, Newport Beach, CA (US)

(73) Assignee: Brand Affinity Technologies, Inc., Irvine, CA (US)

( * ) Notice: Subject to any disclaimer, the term of this patent is extended or adjusted under 35 U.S.C. 154(b) by 81 days.

(21) Appl. No.: 12/589,843

(22) Filed: Oct. 29, 2009

(65) Prior Publication Data

US 2010/0114863 A1 May 6, 2010

Related U.S. Application Data

(63) Continuation-in-part of application No. 12/587,940, filed on Oct. 14, 2009, now Pat. No. 8,548,844, which is a continuation-in-part of application No. 12/220,917, filed on Jul. 29, 2008, which is a continuation-in-part of application No. 12/144,194, filed on Jun. 23, 2008, which is a continuation-in-part of application No. 11/981,646, filed on Oct. 31, 2007, which is a continuation-in-part of application No. 11/981,837, filed on Oct. 31, 2007, now Pat. No. 7,809,603, which is a continuation-in-part of application No. 12/072,692, filed on Feb. 27, 2008, and a continuation-in-part of application No. 12/079,769, filed on Mar. 27, 2008, application No. 11/981,837, which is a continuation-in-part of application No. 12/042,913, filed on Mar. 5, 2008, which is a continuation-in-part of application No. 12/072,692, filed on Feb. 27, 2008, which is a continuation of application No. 11/981,646, filed on Oct. 31, 2007.

(60) Provisional application No. 61/109,214, filed on Oct. 29, 2008, provisional application No. 60/993,096, filed on Sep. 7, 2007.

(51) Int. Cl.
| | |
|---|---|
| *G06F 7/00* | (2006.01) |
| *G06F 17/30* | (2006.01) |
| *G06Q 30/02* | (2012.01) |
| *G06Q 40/04* | (2012.01) |

(52) U.S. Cl.
CPC ...... *G06F 17/30864* (2013.01); *G06F 17/3089* (2013.01); *G06F 17/30867* (2013.01); *G06Q 30/02* (2013.01); *G06Q 40/04* (2013.01)
USPC .......................................... 707/709; 707/705

(58) Field of Classification Search
CPC .......... G06F 17/30864; G06F 17/3089; G06F 17/30867; G06Q 30/02; G06Q 40/04
USPC .................................................. 707/705, 709
See application file for complete search history.

(56) References Cited

U.S. PATENT DOCUMENTS

| | | |
|---|---|---|
| 6,141,657 A | 10/2000 | Rothberg et al. |
| 6,253,188 B1 | 6/2001 | Witek et al. |
| 6,338,067 B1 | 1/2002 | Baker et al. |
| 6,496,803 B1 | 12/2002 | Seet et al. |
| 6,629,081 B1 | 9/2003 | Cornelius et al. |
| 6,698,020 B1 | 2/2004 | Zigmond |
| 6,839,681 B1 | 1/2005 | Hotz |
| 6,907,581 B2 | 6/2005 | Noy |
| 6,954,728 B1 | 10/2005 | Kusumoto et al. |
| 7,003,420 B2 | 2/2006 | Ur et al. |
| 7,058,624 B2 | 6/2006 | Masters |
| 7,200,565 B2 | 4/2007 | Basson et al. |
| 7,584,118 B1 | 9/2009 | Bellare et al. |
| 2001/0037205 A1 | 11/2001 | Joao |
| 2002/0002488 A1 | 1/2002 | Muyres et al. |
| 2002/0042738 A1 | 4/2002 | Srinivasan et al. |
| 2002/0056120 A1 | 5/2002 | McTernan et al. |
| 2002/0073084 A1 | 6/2002 | Kauffman et al. |
| 2002/0103698 A1 | 8/2002 | Cantrell |
| 2002/0123994 A1 | 9/2002 | Schabes et al. |
| 2002/0141584 A1 | 10/2002 | Razdan et al. |
| 2002/0178447 A1 | 11/2002 | Plotnick et al. |
| 2002/0194070 A1 | 12/2002 | Totham et al. |
| 2003/0023598 A1 | 1/2003 | Janakiraman et al. |
| 2003/0078828 A1 | 4/2003 | Basson et al. |
| 2003/0229507 A1 | 12/2003 | Perge |
| 2004/0030741 A1 | 2/2004 | Wolton et al. |
| 2004/0059996 A1 | 3/2004 | Fasciano |
| 2004/0122735 A1 | 6/2004 | Meshkin |

| | | | |
|---|---|---|---|
| 2004/0143600 A1 | 7/2004 | Musgrove et al. | |
| 2004/0186776 A1 | 9/2004 | Llach | |
| 2004/0216157 A1 | 10/2004 | Shain et al. | |
| 2004/0225647 A1 | 11/2004 | Connelly et al. | |
| 2004/0249700 A1 | 12/2004 | Gross | |
| 2005/0004891 A1* | 1/2005 | Mahoney et al. | 707/3 |
| 2005/0010475 A1 | 1/2005 | Perkowski et al. | |
| 2005/0033664 A1* | 2/2005 | Moon et al. | 705/27 |
| 2005/0091328 A1* | 4/2005 | Saeidi | 709/206 |
| 2005/0137939 A1 | 6/2005 | Calabria et al. | |
| 2005/0209909 A1 | 9/2005 | Dull et al. | |
| 2005/0234998 A1 | 10/2005 | Lesandrini et al. | |
| 2005/0246314 A1* | 11/2005 | Eder | 707/1 |
| 2006/0004691 A1 | 1/2006 | Sifry | |
| 2006/0026067 A1 | 2/2006 | Nicholas et al. | |
| 2006/0041562 A1 | 2/2006 | Paczkowski et al. | |
| 2006/0069663 A1 | 3/2006 | Adar et al. | |
| 2006/0094506 A1 | 5/2006 | Tarter et al. | |
| 2006/0111967 A1 | 5/2006 | Forbes | |
| 2006/0123053 A1 | 6/2006 | Scannell, Jr. | |
| 2006/0129446 A1 | 6/2006 | Ruhl et al. | |
| 2006/0136402 A1* | 6/2006 | Lee | 707/3 |
| 2006/0143158 A1 | 6/2006 | Ruhl et al. | |
| 2006/0167784 A1 | 7/2006 | Hoffberg | |
| 2006/0178918 A1 | 8/2006 | Mikurak | |
| 2006/0195863 A1 | 8/2006 | Whymark | |
| 2006/0212350 A1 | 9/2006 | Ellis | |
| 2006/0218141 A1 | 9/2006 | Tuttle et al. | |
| 2006/0224452 A1 | 10/2006 | Ng | |
| 2006/0230011 A1 | 10/2006 | Tuttle et al. | |
| 2006/0277105 A1 | 12/2006 | Harris | |
| 2006/0282283 A1* | 12/2006 | Monahan | 705/1 |
| 2006/0287916 A1 | 12/2006 | Starr et al. | |
| 2007/0005424 A1 | 1/2007 | Arauz | |
| 2007/0021597 A1* | 1/2007 | Edwards et al. | 536/23.2 |
| 2007/0027743 A1 | 2/2007 | Carson | |
| 2007/0053513 A1 | 3/2007 | Hoffberg | |
| 2007/0061199 A1 | 3/2007 | Montgomery et al. | |
| 2007/0067297 A1 | 3/2007 | Kublickis | |
| 2007/0074258 A1 | 3/2007 | Wood | |
| 2007/0089129 A1 | 4/2007 | Verhaegh | |
| 2007/0100688 A1 | 5/2007 | Book | |
| 2007/0112630 A1 | 5/2007 | Lau et al. | |
| 2007/0143186 A1 | 6/2007 | Apple et al. | |
| 2007/0143345 A1 | 6/2007 | Jones et al. | |
| 2007/0156677 A1 | 7/2007 | Szabo | |
| 2007/0157228 A1 | 7/2007 | Bayer et al. | |
| 2007/0162335 A1 | 7/2007 | Mekikian | |
| 2007/0162926 A1 | 7/2007 | Steelberg et al. | |
| 2007/0192129 A1 | 8/2007 | Fortuna | |
| 2007/0198344 A1 | 8/2007 | Collison et al. | |
| 2007/0200850 A1* | 8/2007 | Shah et al. | 345/440 |
| 2007/0219940 A1 | 9/2007 | Mueller et al. | |
| 2007/0239530 A1 | 10/2007 | Datar et al. | |
| 2007/0239535 A1 | 10/2007 | Koran et al. | |
| 2007/0250901 A1 | 10/2007 | McIntire et al. | |
| 2007/0260520 A1 | 11/2007 | Jha et al. | |
| 2007/0266326 A1 | 11/2007 | Evans et al. | |
| 2007/0276823 A1* | 11/2007 | Borden et al. | 707/5 |
| 2007/0282684 A1 | 12/2007 | Prosser et al. | |
| 2007/0288309 A1 | 12/2007 | Haberman et al. | |
| 2007/0288431 A1 | 12/2007 | Reitter et al. | |
| 2008/0004947 A1 | 1/2008 | Mathew et al. | |
| 2008/0004992 A1* | 1/2008 | King et al. | 705/27 |
| 2008/0033587 A1 | 2/2008 | Kurita et al. | |
| 2008/0033736 A1 | 2/2008 | Bulman | |
| 2008/0033776 A1 | 2/2008 | Marchese | |
| 2008/0033790 A1 | 2/2008 | Nickerson et al. | |
| 2008/0033806 A1 | 2/2008 | Howe et al. | |
| 2008/0034314 A1 | 2/2008 | Louch et al. | |
| 2008/0040175 A1 | 2/2008 | Dellovo | |
| 2008/0052541 A1 | 2/2008 | Ginter et al. | |
| 2008/0056574 A1* | 3/2008 | Heck | 382/177 |
| 2008/0059208 A1 | 3/2008 | Rockfeller et al. | |
| 2008/0059286 A1 | 3/2008 | Nickerson et al. | |
| 2008/0065491 A1 | 3/2008 | Bakman | |
| 2008/0071620 A1* | 3/2008 | Lowe | 705/14 |
| 2008/0077574 A1 | 3/2008 | Gross | |
| 2008/0086368 A1 | 4/2008 | Bauman | |
| 2008/0086432 A1 | 4/2008 | Schmidtler et al. | |
| 2008/0090551 A1 | 4/2008 | Gidron et al. | |
| 2008/0091516 A1 | 4/2008 | Giunta | |
| 2008/0103886 A1 | 5/2008 | Li et al. | |
| 2008/0104542 A1* | 5/2008 | Cohen et al. | 715/810 |
| 2008/0109285 A1 | 5/2008 | Reuther et al. | |
| 2008/0120325 A1 | 5/2008 | Davis | |
| 2008/0126178 A1 | 5/2008 | Moore | |
| 2008/0126476 A1 | 5/2008 | Nicholas et al. | |
| 2008/0140502 A1 | 6/2008 | Birnholz et al. | |
| 2008/0140621 A1* | 6/2008 | Martinez et al. | 707/3 |
| 2008/0154625 A1 | 6/2008 | Serbanescu | |
| 2008/0162281 A1 | 7/2008 | Davis et al. | |
| 2008/0167957 A1 | 7/2008 | Steelberg et al. | |
| 2008/0168135 A1 | 7/2008 | Redlich et al. | |
| 2008/0172293 A1 | 7/2008 | Raskin et al. | |
| 2008/0183806 A1 | 7/2008 | Cancel | |
| 2008/0209001 A1 | 8/2008 | Boyle et al. | |
| 2008/0215474 A1 | 9/2008 | Graham | |
| 2008/0243767 A1 | 10/2008 | Naibo et al. | |
| 2008/0249855 A1 | 10/2008 | Collins | |
| 2008/0255936 A1 | 10/2008 | Ghate | |
| 2008/0263025 A1* | 10/2008 | Koran | 707/5 |
| 2009/0006388 A1* | 1/2009 | Ives et al. | 707/5 |
| 2009/0030969 A1* | 1/2009 | Dutta et al. | 709/201 |
| 2009/0037355 A1* | 2/2009 | Brave et al. | 706/45 |
| 2009/0069078 A1* | 3/2009 | Nguyen et al. | 463/25 |
| 2009/0112685 A1* | 4/2009 | Tunguz-Zawislak et al. | 705/10 |
| 2009/0254572 A1* | 10/2009 | Redlich et al. | 707/10 |
| 2010/0017398 A1* | 1/2010 | Gupta et al. | 707/5 |
| 2010/0138403 A1* | 6/2010 | Kapur et al. | 707/706 |
| 2010/0162302 A1* | 6/2010 | Halke et al. | 725/35 |
| 2010/0275128 A1* | 10/2010 | Ward et al. | 715/744 |
| 2011/0166918 A1* | 7/2011 | Allaire et al. | 705/14.7 |
| 2011/0173212 A1* | 7/2011 | Tuttle et al. | 707/752 |
| 2012/0072409 A1* | 3/2012 | Perry et al. | 707/710 |
| 2012/0254151 A1* | 10/2012 | Reitter et al. | 707/709 |
| 2012/0310946 A1* | 12/2012 | Loftus et al. | 707/741 |

FOREIGN PATENT DOCUMENTS

WO    WO2007029881    3/2007

OTHER PUBLICATIONS

Garthwaite, et al., "The Role of Celebrity Endorsements in Politics: Oprah, Obama, and the 2008 Democratic Primary," Department of Economics, University of Maryland, Sep. 2008, Entire Document; http://econweb.umd.edu/~garthwaite/celebrityendorsements_garthwaitemoore.pdf.

Tong, X., Creation of Brand Equity in the Chinese Clothing Market, Dissertation, Graduate School University of Missouri-Columbia, Dec. 2006; http://edt.missouri.edu/Fall2006/Dissertation/TongX-120806-D6156/research.pdf.

* cited by examiner

*Primary Examiner* — Ajay Bhatia
*Assistant Examiner* — Jessica N Le
(74) *Attorney, Agent, or Firm* — Barnes & Thornburg LLP; Thomas J. McWilliams; Edward F. Behm, Jr.

(57) ABSTRACT

An apparatus, system and method for an open indexing system, which includes an indexing engine associated with at least one processor and having one or more open inputs for inputting of indexing criteria, at least one computerized search engine for obtaining information across at least one computing network in accordance with the indexing criteria, at least one repository comprising at least one computing memory for storing information obtained via the at least one computerized search engine and corresponded to the indexing criteria, and at least one reporting engine, wherein an output of the reporting engine is manipulable responsive to modification to one or more categorizations dependent on the indexing criteria, and wherein the output is dependent solely on the information in said at least one repository.

17 Claims, 6 Drawing Sheets

SEARCH AND STORAGE ENGINE HAVING VARIABLE INDEXING FOR INFORMATION ASSOCIATIONS

CROSS-REFERENCE TO RELATED APPLICATIONS

This application claims priority to U.S. Provisional Patent Ser. No. 61/109,214, entitled "A Search And Storage Engine Having Variable Indexing For Information Associations," filed Oct. 29, 2008; and is a continuation-in-part of U.S. patent application Ser. No. 12/587,940, entitled "Apparatus, System And Method For A Brand Affinity Engine Using Positive And Negative Mentions And Indexing," filed Oct. 14, 2009 now abandoned.

U.S. patent application Ser. No. 12/587,940 is: a continuation-in-part of U.S. patent application Ser. No. 12/220,917, entitled "System and Method for Distributing Content for Use with Entertainment Creatives, filed Jul. 29, 2008 is: a continuation-in-part of U.S. patent application Ser. No. 12/144,194, entitled "System and Method for Brand Affinity Content Distribution and Optimization", filed Jun. 23, 2008 is: a continuation-in-part of U.S. patent application Ser. No. 11/981,646, entitled "Engine, System and Method for Generation of Brand Affinity Content", filed Oct. 31, 2007; a continuation-in-part of U.S. patent application Ser. No. 11/981,837, entitled "An Advertising Request And Rules-Based Content Provision Engine, System and Method", filed Oct. 31, 2007; now U.S. Pat. No. 7,809,603 a continuation-in-part of U.S. patent application Ser. No. 12/072,692, entitled "Engine, System and Method For Generation of Brand Affinity Content, filed Feb. 27, 2008; and a continuation in part of U.S. patent application Ser. No. 12/079,769, entitled "Engine, System and Method for Generation of Brand Affinity Content," filed Mar. 27, 2008, the disclosures of which are incorporated by reference herein as if set forth in their entirety.

U.S. patent application Ser. No. 11/981,837 claims priority to U.S. Provisional Application Ser. No. 60/993,096, entitled "System and Method for Rule-Based Generation of Brand Affinity Content," filed Sep. 7, 2007, and is related to U.S. patent application Ser. No. 11/981,646, the disclosures of which are incorporated by reference herein as if set forth in their entirety.

U.S. patent application Ser. No. 12/079,769 is a continuation-in-part of U.S. patent application Ser. No. 12/042,913, entitled "Engine, System and Method for Generation of Brand Affinity Content," filed Mar. 5, 2008, which is also a continuation-in-part of U.S. patent application Ser. No. 12/072,692, the disclosures of which are incorporated by reference herein as if set forth in their entirety.

U.S. patent application Ser. No. 12/072,692 is a continuation-in-part of U.S. patent application Ser. No. 11/981,646.

BACKGROUND OF THE INVENTION

1. Field of the Invention

The present invention is directed to affinity and search-related software and, more particularly, to an apparatus, system and method for a search and storage engine having variable indexing for information associations.

2. Description of the Background

In typical current advertising embodiments, although sponsorship and promotional media is an 80 billion dollar industry in the United States, very little sponsorship and promotional advertising is engaged in "on-line," that is, in networked telecommunications environments such as Internet, extranet, intranet, satellite, wired, wireless, including ad-hoc wireless, and similar communication networks, which employ computers, personal digital assistants, conference phones, cellular telephones and the like. In fact, it its estimated that only 250 million dollars in on-line advertising using sponsorship and promotional material is made available in the United States, or 0.31% of the aforementioned 80 billion dollar industry.

Further, the inefficiencies of obtaining sponsorship and promotional sport in advertising drastically limit the universe of available sponsors and promoters, at least in that, if procurement of a brand can take several months, it stands to reason that advertisers will endeavor to obtain only those sponsors that the advertisers can be assured will have a positive public image and likeability over the course of many months. Needless to say, this drastically limits the universe of available sponsors. For example, it is estimated that, in the multi-billion dollar athletic sponsorship advertising industry, 95% of sponsorship dollars are spent hiring the top 5% of athletes to become sponsors. As such, very few sponsorships are made available by the prior art to less desirable athletes, although such athletes may be less desirable for any of a number of reasons, at least some of which reasons are unrelated to likeability or negative image. For example, a baseball player may be a perennial all-star, but may play in a "small market," and as such may not be deemed to fall within the top 5% of athlete-sponsors. Consequently, although the exemplary player may be very popular in certain areas or with certain demographics, in the prior art it is very unlikely this particular exemplary athlete will obtain much in the way of sponsorships.

Needless to say, the typically lengthy mechanism that precludes sponsorship from occurring on-line thus, as discussed above, drastically limits the available universe of sponsors. Further, such current mechanisms fail to take into account that certain sponsors may have a willingness to engage in certain sponsorships at certain times, with respect to certain products, or in certain geographic locales, or may be desired as sponsors at certain times, or only in certain geographic locales, or only with regard to certain products. For example, in the sponsorship industry, it is well established that famous actors in the United States may market products internationally that they do not wish to lend sponsorship to in the United States. Additionally, because news with regard to United States athletes or actors, for example, may break more quickly in the United States, those same athletes or actors may experience a lengthened time of availability for desirable sponsorship in other countries. For example, a baseball player may come to be suspected of steroid use in the United States, thereby limiting-his desirability as a sponsor for products in the United States, but may nonetheless continue to be popular in Japan until or if such steroid use is definitively proven. Thereby, an inability to efficiently provide for that baseball player to become a sponsor in Japan, where that baseball player may not normally allow for his likeness to be used in sponsorship, may seriously curtail sponsorship opportunities for that baseball player, as well as curtailing advertising possibilities for Japanese advertisers.

Thus, the need exists for an apparatus, system and method to allow for assessment of optimal sponsors for particular markets and/or in particular geographies, and that provides increased sponsorship opportunities in particular markets and/or in particular geographies.

SUMMARY OF THE INVENTION

The present invention includes at least an apparatus, system and method of implementing a computerized brand affinity engine. The apparatus, system and method include at least a plurality of computerized access points having accessible thereto a plurality of sites mentioning at least one sponsor, a categorized, hierarchical database of keywords, wherein at least the keywords falling in at least one category of the hierarchy correspond to a sponsor category of the at least one sponsor, and a tracker, wherein the tracker tracks positive ones of the mentions of the at least one sponsor on ones of the plurality of sites and negative ones of the mentions of the at least one sponsor on ones of the plurality of sites, in accordance with positive and negative keywords of the categorized, hierarchical database in the sponsor category, and wherein the tracker issues an rating with regard to the at least one sponsor in accordance with the positive ones and the negative ones of the mentions.

The present invention further includes an apparatus, system and method for an open indexing system, which includes an indexing engine associated with at least one processor and having one or, more open inputs for inputting of indexing criteria, at least one computerized search engine for obtaining information across at least one computing network in accordance with the indexing criteria, at least one repository comprising at least one computing memory for storing information obtained via the at least one computerized search engine and corresponded to the indexing criteria, and at least one reporting engine, wherein an output of the reporting engine is manipulable responsive to modification to one or more categorizations dependent on the indexing criteria, and wherein the output is dependent solely on the information in said at least one repository.

Thus, the present invention provides an apparatus, system and method to allow for assessment of optimal sponsors for particular markets and/or in particular geographies, and that provides increased sponsorship opportunities in particular markets and/or in particular geographies.

BRIEF DESCRIPTION OF THE FIGURES

The present invention will be described hereinbelow in conjunction with the following figures, in which like numerals represent like items, and wherein.

DETAILED DESCRIPTION OF THE INVENTION

It is to be understood that the figures and descriptions of the present invention have been simplified to illustrate elements that are relevant for a clear understanding of the present invention, while eliminating, for the purposes of clarity, many other elements found in typical computing apparatuses, systems and methods. Those of ordinary skill in the art will recognize that other elements are desirable and/or required in order to implement the present invention. However, because such elements are well known in the art, and because they do not facilitate a better understanding of the present invention, a discussion of such elements is not provided herein.

It is generally accepted that advertising (hereinafter also referred to as "ad" or "creative") having the highest impact on the desired consumer base includes endorsements, sponsorships, or affiliations from those persons, entities, or the like from whom the targeted consumers seek guidance, such as based on the endorser's knowledge of particular goods or in a particular industry, the fame of the endorser, the respect typically accorded a particular endorser or sponsor, and other similar factors. Additionally, the easiest manner in which to sell advertising time or blocks of advertising time is to relay to a particular advertiser that the advertising time purchased by that advertiser will be used in connection with an audio visual work that has an endorsement therein for that particular advertiser's brand of goods or services. As used herein, such an endorsement may include an assertion of use of a particular good or service by an actor, actress, or subject in the audio visual work, reference to a need for particular types of goods or services in the audio visual work, or an actual endorsement of the use of a product within the audio visual work.

Endorsements may be limited in certain ways, as will be apparent to those skilled in the art. Such limitations may include geographic limitations on the use of particular products (endorsers are more likely to endorse locally in various locales rather than nationally endorse, in part because national endorsements bring a single endorsement fee and generally preclude the repetitious collection of many smaller fees for many local endorsements), or limitations on the use of endorsements in particular industries, wherein a different product or a different industry may be endorsed (such as in a different geographical area) by the same endorser, or limitations on endorsements solely to a particular field(s) or type(s) of product, rather than to a specific brand of product. Further, endorsements by particular endorsers may be limited to products, brands or products or services, types of products or services, or the like which have been approved by one or more entities external from, but affiliated with, the specific endorser. For example, the National Football League may allow for its players only to endorse certain products, brands of products, types of products, or the like, that are also endorsed by the NFL.

More specifically, as used herein endorsements may include: endorsements or sponsorships, in which an individual or a brand may be used to market another product or service to improve the marketability of that other product or service; marketing partnerships, in which short term relationships between different products or services are employed to improve the marketing of each respective product or service; and brand affinity, which is built around a long term relationship between different products or services such that, over time, consumers come to accept an affinity of one brand based on its typical placement with another brand in another industry.

At present, there is a need for a platform or engine to allow for the obtaining of an endorsement, or endorsed ad, in any of the aforementioned circumstances, either from a specific individual, a specific entity, an affinity brand, a marketing partner, or a sponsor. The development of a targeted advertisement involves a dynamic interrelationship between all relevant factors, such as, for example, the goods, the purchasers, the endorsing personalities and their agents, and the existing or upcoming media associated with each. The ideal advertisement engine must be able to harness and manage all aspects of each of these factors, based upon only a limited number of parameters from which to initiate and generate the advertisement.

Figure 1:
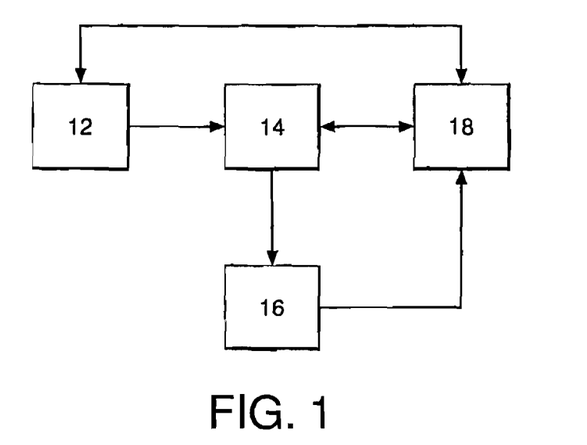
FIG. 1 illustrates an exemplary embodiment of the present invention.

As illustrated in FIG. 1, the brand affinity software engine 10 of the present invention may provide a recommendation engine 12, a creative engine 14, a fulfillment engine 16, and a management engine 18. Those skilled in the art will appreciate that, although these engines are illustrated collectively in FIG. 1, that the present invention additionally contemplates the use of each of these engines discretely from the remaining illustrated engines. In this exemplary embodiment, the recommendation engine may, based on any number of known or assessed factors, recommend a sponsorship brand for use at certain times, in certain geographies, or with regard to certain products or services. The recommendation engine may generate recommendation metrics, may issue scores, rankings, or the like. The creative engine may provide one or more templates for the creation of sponsored advertisements, and may additionally provide content, such as from a content "vault" that includes content of a variety of media formats and with respect to a myriad of sponsors, for inclusion in a creative generated using the advertising template. For example, such content may include text, such as quotes, audio, video, pictures, highlights, or the like, and such content may have limited availability categorized by time, location, product, service, or the like. The fulfillment engine of the present invention may, based on direct or redirect advertising delivery, deliver the advertisements created using the creative engine. It almost goes without saying that advertisements created for fulfillment using other advertising creation engines may likewise be incorporated into the fulfillment engine of the present invention for delivery with advertisements created using the creative engine of the present invention. Finally, the management engine of the present invention provides for tracking and reporting, as well as feedback for improved metrics, of the advertisements placed using the present invention.

Figure 2:
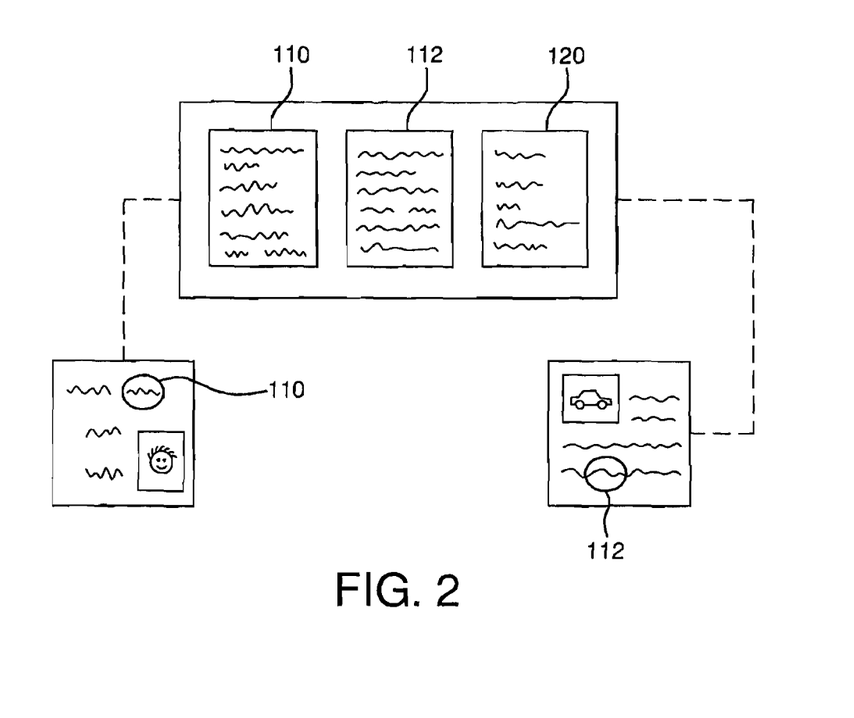
FIG. 2 illustrates an aspect of the present invention.

As referenced hereinabove, the recommendation engine may provide brand metrics for sponsoring brands, and the management engine may provide feedback with regard to modifying or improving the brand metrics of sponsoring brands and/or sponsored ads. Such metrics may be gauged in any number of ways, certain of which will be apparent to those skilled in the art in light of the disclosure herein. For example, as illustrated in FIG. 2, positive 110 and negative 112 mentions of sponsoring brands 114 may be tracked, such as by comparison of those brands with predetermined sets and/or subsets of "good" and "bad" keywords 120 for association with those sponsoring brands. Thereby, valuation may be assigned to certain keywords in the present invention, and the value of certain sponsoring brands may be tracked, based on association with those keywords, over time, in certain geographies, in certain markets, and/or with regard to certain products or services, and the like. Keywords may, of course, be "good" to be associated with, meaning such keywords are indicative of positive associations with the sponsoring brand, "bad" to be associated with, meaning such keywords are indicative of negative associations with the sponsoring brand, or "neutral."

Figure 3:
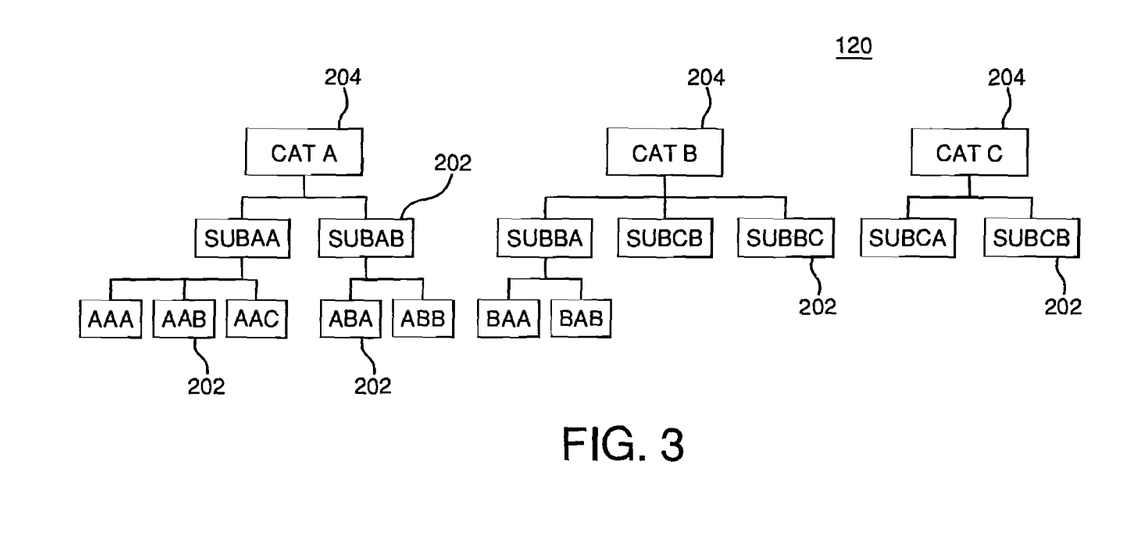
FIG. 3 illustrates an aspect of the present invention.

Such keywords may be hierarchically organized as illustrated in FIG. 3, such that searches are performed only on certain categorically matched subsets 202 of such keywords 120 for sponsoring brands falling in particular categories 204. Needless to say, all keywords may be run against all brands, rather than employing the aforementioned hierarchal setup, and/or certain sponsoring brands may be associated with multiple subsets of keywords simultaneously based on their presence in multiple categories of sponsoring brands.

Figure 4:
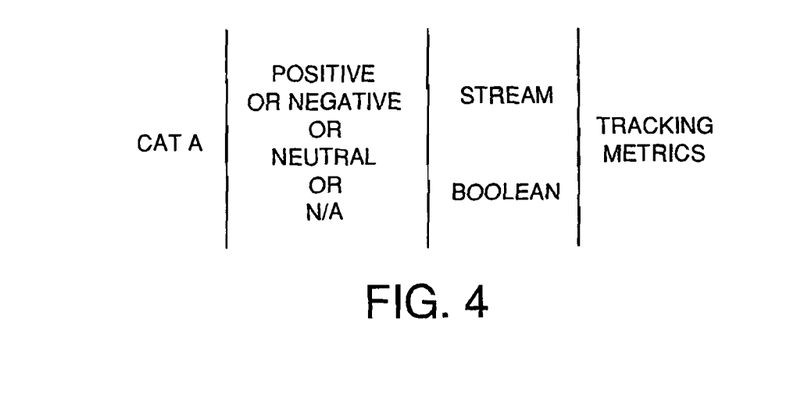
FIG. 4 illustrates an aspect of the present invention.

Thus, for example, a certain sponsoring brand falling within the category "professional sports," a subset "baseball," and the sub-subset "San Francisco Giants," may be subjected to a plurality of Google or other search engine searches in association with positive keywords, such as home run, all star, hall of fame, charity, game winning, outstanding, of the year, and the like. Conversely, the presence of a baseball player in such a category may indicate similar searches for negative keywords such as steroids, cheat, gamble, attorney, perjury, court case, jail, incident, arrest, drunk driving, and the like. Needless to say, such positive or negative searches may be performed in a strictly boolean manner, such as requiring only the presence of the named athlete and one of the key words in a particular location, or may be performed as stream expression searches, whereby a mention of the athlete within five words of a certain keyword or ten words of another keyword, is searched. Such searches are illustrated in FIG. 4. Needless to say, such searches may, in the case of Google, for example, return a number of hits for positive or negative keywords. Alternatively, other media may be searched, such as wherein a number of youTube views are tracked for positive or negative videos or audio, greater numbers of views or downloads are tracked as being more positive on youTube or iTunes, positive or negative references are tracked in on-line and/or print media, such as magazines and newspapers, video requests are tracked Internet-wide for videos using the sponsor, iTune downloads are tracked for videos or audio using the sponsor, number of presences on YouTube or iTunes is tracked, or the like.

As mentioned hereinabove, the value of a reference to a sponsoring brand in association with a particular keyword may receive a rating, such as wherein the keyword has a particular rating associated with it, or, for example, wherein the number of times a person has been associated with that reference receives a different rating, such as a strength of reference rating. For example, if a particular football player receives ten thousand references in accordance with a particular search, and only one of the ten thousand references mentions the negative keyword "marital affair", it stands to reason that such a reference is unlikely to have any true negative effect on a sponsoring brand, in part because such a limited reference is unlikely to be very reliable. Thus, a strength of reference may increase as the number of associated references of a particular sponsoring brand with a particular keyword or keywords continue to occur.

Further, for example, a first time reference may act as a triggering mechanism for review for additional references. For example, a recent scandal affecting a National Football League team involved a party on a boat, and although "boat" might not be a term typically searched for in association with a National Football League player, a first time mention of a player in association with the word "boat" may act as a triggering mechanism for additional searching for mention of that player, or those players, in association with that keyword.

In an exemplary embodiment of the present invention, a football player is mentioned in association with a particular keyword. The keyword association may be assigned a +1 to +10 rating for a positive keyword associative mention, or a −1 to a −10 rating for a negative keyword association. Additionally, if the associated keyword is flagged for association with the sponsoring brand searched, but in actuality does not apply for any one of a number of reasons, such as an unreliable source or an actual reference to a different party, the association may be marked with a N/A, for example. Such associations and keyword rating of mentions may be performed automatically, or, upon flagging of a particular sponsorship brand, may be performed manually. Manual searchers may, needless to say, receive training in order to use consistent numerical ratings for associative mentions. Further, manual searchers may receive retraining such as wherein, for example, 100 searchers rated a particular mention or series of mentions as a +5. In such a case, such mentions or similar mentions may be repeatedly re-routed to a particular searcher-in-trainer until that searcher in training begins to rate such mentions within a predetermined acceptable variation of +5.

Continuing with the aforementioned exemplary embodiment, upon occurrence of a triggering mechanism, searches may be performed at predetermined intervals, such as daily or weekly, to check for a second and additional associative mentions. Thereby, a number of associative mentions at a particular rating may be assigned. For example, the mention of baseball player John Doe in association with "steroid scandal" may receive a rating of −5 for the first one hundred mentions, and −7 for all additional mentions, and may result in two hundred mentions at an average of −6 rating. Thereby, with respect to that keyword, baseball player John Doe would receive a total rating of −1200. However, if during the same time frame the same baseball player John Doe was mentioned two hundred times in conjunction with "charitable contributions", at an average rating of +7, baseball player John Doe may receive a +1400 rating during the same time frame. Thus, mentions of baseball player John Doe may be separately tracked as positive mentions, negative mentions, neutral mentions, and/or may be combined into an overall rating, which in the above-referenced example would be a +200, during the referenced time frame in the market tracked and based on the keywords tracked. Thereby, a sponsoring brand may have associated therewith a "heat index," wherein the greater the total positive rating for all keywords tracked in all markets tracked may constitute how "hot" a sponsor is globally, and similarly a total negative rating would track how "cold" a particular sponsoring brand was. Needless to say, the above is exemplary in nature only, and similarly tracking could occur not only on a positive or negative association basis, but additionally on a geographic, product, service, or other basis. For example, the aforementioned "hot" and "cold" rating system may be used to draw a geographic "heat map," wherein the rating of a sponsoring brand in particular geographic markets may be laid out on a map illustrating the hotness or coldness of the sponsoring brand uniquely in each geographic market tracked.

Additionally and alternatively, the associative mechanism discussed hereinabove can operate with any desired sponsoring brand, and not necessarily a particular person. For example, exemplary brand "Red Fish Blue Fish Sail Boats" may be searched in conjunction with "sea worthy," "best value," "most popular" and "great fun" for positive associations, and may be searched in association with "crash," "death," or "sink" for negative association. Thereby, the recommendation engine of the present invention may be extended beyond sponsorship, and may be used to assign positive or negative ratings to almost any entity. Thus, particular entities may make use of the present invention to monitor the strength of their own respective brands, such as in different markets or in different geographies.

Further, for example, the present invention may be used in the performance of searches, such as internet-based searches, for positive and negative mentions associated with anything or anyone, and in fact the present invention may thus provide a mechanism whereby a searcher can engage the present invention to search not only with regard to just selected entities or persons, but further with regard to only certain keywords or subsets of keywords. For example, parents may perform global searches for the names of children in association with keywords such as "drugs", or may limit searches to the names of children and their friends only on MySpace.com, only in the state of Wisconsin, and/or only with regard to all subsets of keywords under the topic "drugs." Likewise, for example, prospective clients may perform keyword searches for their prospective attorneys or doctors in association with keywords such as "malpractice."

Thus, a brand affinity rating may be assigned in accordance with the recommendation engine of the present invention. Needless to say, the attributes and/or keywords reviewed for association with particular brands or sponsoring brands may vary by industry, such that the present invention may be used to generate side-by-side comparisons versus competitors by time, geography, product, or the like. For example, in the pharmaceutical industry, a particular brand name may be searched for associations versus a generic equivalent, using keywords such as "side effect," "health benefit," "cost effective," and the like. Such a search may be performed by time, by geography, or the like. For example, if a brand name manufacturer of a high blood pressure drug suddenly sees a dip in its rating too, for example, a
−700 versus competing generics in a certain geographic region, such as the northwestern United States, it becomes obvious that that particular brand name must assess what sort of news has broken in the northwestern United States to negatively affect the brand versus the generic, and/or must change or improve their marketing program in some way in the northwestern United States.

Similarly, the present invention may be used as a tool for marketing projections over time. It almost goes without saying that the most positive effect an advertising tool can have is to predict who the next big sponsoring brand will be in a particular market or in a particular locale, for example. For example, it may be that certain events on the PGA tour in certain locales create particularly positive "buzz" for certain players on the PGA tour in those areas. Such an outcome would not be surprising, because, of course, as the PGA tour moves to different events, the media moves with the touring professionals, and thus the qualitative and quantitative mentions of those touring professionals will increase with the movement of the tour, that is, will increase in the locales of the next tour events. However, this may not be the case for every tour event, such as the minor tour events, or it may not be the case for every touring professional in every locale. For example, foreign touring professionals may not experience increased buzz in certain locales, such as in the deep southern United States.

The present invention, nonetheless, can predict, in the aforementioned example, what PGA tour event, in what city, will affect, or most positively affect, what touring professional or professionals. Thus, using the present invention as a predictive tool, an advertiser can buy sponsorship of a sponsoring brand of the touring professional experiencing the most positive buzz in the particular locale just before the increase in publicity is to occur. The present invention may, of course, additionally make use of historical data on the "buzz" associated with a certain tour professional in a certain locale to further refine the predictive capabilities of the present invention based on the positive and negative mentions associated with that tour professional.

Of course, because the present invention connects the brand metrics of the recommendation engine to the generation of a creative in the creative engine, and subsequently to the fulfillment engine wherein a buy of available advertising space occurs for placement of the creative, the present invention allows for a connection of the purchase of available advertising space directly with the brand affinity metrics discussed hereinabove. More specifically, available advertising space may be purchased, for example, by a particular advertiser for use with a particular sponsor only in those geographies in which that advertisement with that sponsor will have the greatest impact. Additionally, this may occur, as discussed hereinabove, in a predictive manner, wherein advertising space is purchased cheaply in advance of a particular occurrence, but when the event occurs, the use of that advertising space in conjunction with the sponsoring brand provides a maximized impact for the minimal expense incurred in buying the available advertising space in advance.

The presence of the management engine in the present invention allows for feedback with regard to the success of advertisements placed by time, location, product, service, or the like. Further, such feedback may allow for the comparisons discussed hereinthroughout, such as comparison of a particular sponsoring brand against a baseline "no sponsoring brand". Thus, the positive effects of the use of sponsoring brands may be tracked by sponsoring brand, product, service, market, time, geography, or the like.

As such, the present invention, although capable of measuring the value of a particular creative, product, or service, more importantly provides a measurement of what, or who, can endorse a particular product or service in order to help sell that product or service at a particular time, to a particular market, or in a particular location. For example, the present invention might allow for an assessment that a significant sports star, such as Tiger Woods, which one might not necessarily think would constitute a good endorser of hand soap, would indeed be a failed brand association during the summertime in Texas on automotive-related websites. However, the present invention might likewise provide a somewhat surprising assessment that Tiger Woods advertising hand soap on a cosmetics site in the winter time in New Jersey would in fact lead to a significant increase in the success of sponsored advertisements placed meeting that criteria. Thus, the present invention provides the capability to leverage sponsoring brands at particular times in particular locations, either by seeking that sponsoring brand, or by searching across multiple sponsoring brands for ones that most cost effectively create the desired buzz at the appropriate time, in the appropriate market, and at the desired location.

Additionally, the present invention may allow for the association of sponsoring brands with certain key events, and for advertisers to be alerted to the likely successful sponsoring brands upon the occurrence of those certain events. For example, the annual inductions into the Baseball, Football or Rock and Roll Halls of Fame may lead to improved sponsorship response to the sponsoring brands inducted into those respective Halls of Fame. Further, the present invention may provide information as to how long such a "bounce" in positive feelings toward the inductees may last from an advertising standpoint. Additionally, the present invention may provide information as to what locations this "bounce" is most likely to occur in. For example, if a particular baseball player is inducted in the Baseball Hall of Fame after playing his entire career for the Philadelphia Phillies, and it is known that the positive bounce for a Baseball Hall of Fame inductee typically lasts three months from the date of their induction and is strongest in the location during which the player played during his career, it would be suggested by the present invention that an advertiser seeking a sponsor in Philadelphia use as the sponsor the Hall of Fame inductee starting upon the Hall of Fame induction and for three months thereafter. Upon the expiration of the three months, the present invention allows for a revision in advertising policy in real time, with a change to a new desirable sponsorship brand occurring almost instantaneously upon the decision to change over from the marketing campaign using the Hall of Fame inductee. Of course, the present invention thus makes available sponsorship opportunities which may not otherwise be available. For example, in the aforementioned example, the present invention may assess that Baseball Hall of Fame inductees typically experience a national "bounce" as sponsors for two weeks following their inductions. Thereby, the aforementioned Philadelphia Phillies player may have open to him a sponsorship opportunity in Seattle for two weeks after his induction into the Hall of Fame, which Seattle sponsorship opportunity might not otherwise be made available to the player.

With regard to improved brand sponsorship gained through the use of the present invention, as discussed hereinthroughout, it is known in the existing art to engage in a myriad of different types of advertisement online. Two such advertisement types are: a search advertising model, in which a user undertakes to search for a good or service of interest and receives, as part of or as indicated with a search result(s), advertisements relevant to purchasing the good or service for which the search was made and/or to purchasing goods or services related to the good or service for which the search was made; and a display advertising model, in which a user is actively viewing a web site and receives, as part of the web site under review, advertisements for the purchase of goods or services relevant to the content of the web site under review. Needless to say, the former operates on the principal that, if a user searches for a good or service, he/she would like to buy that good or service, and the latter operates on the principal that if a user is interested enough in the content of a web site to view that web site, he/she is also likely interested in buying goods or services related to the content of that web site.

The display advertising model mentioned hereinabove is typically embodied as banner on a web site. For example, such banners may appear above, below, to the left, or to the right of the content being viewed, but typically do not impinge upon the content being viewed. The search advertising model mentioned hereinabove is typically embodied as advertisements/banners placed proximate to search results on the search results page responsive to the user search. For example, such advertisements may appear along a right hand side of a search results page, while the search results are displayed along the left hand side of the same search results page.

As discussed immediately above, it is necessarily the case that the correlations performed between the user's searched or viewed content and the advertisements provided will increase the relevance of, and thus the response to, the advertisements. However, such responses in the form of either clicks on the advertisements or purchases made through the advertisement link, once obtained at a particular rate, cannot be further improved merely by the relevance of the advertisements produced. Rather, the only manner to improve the response rate once relevant advertisements are produced is to improve the advertisements themselves based on the users viewing the advertisements.

The present invention provides such improved response advertisement through the provision of improved brand affiliations with the goods and services being advertised, based in part on making use of "buzz" associated with certain sponsors, as discussed hereinthroughout. As discussed, the present invention allows for the production of advertisements having brand sponsorship that is optimized to the market sought. That is, the brand sponsor selected for an advertised good or service is, though the use of the present invention, selected to best correspond to the characteristics of the purchaser sought by the advertisement.

Figure 5:
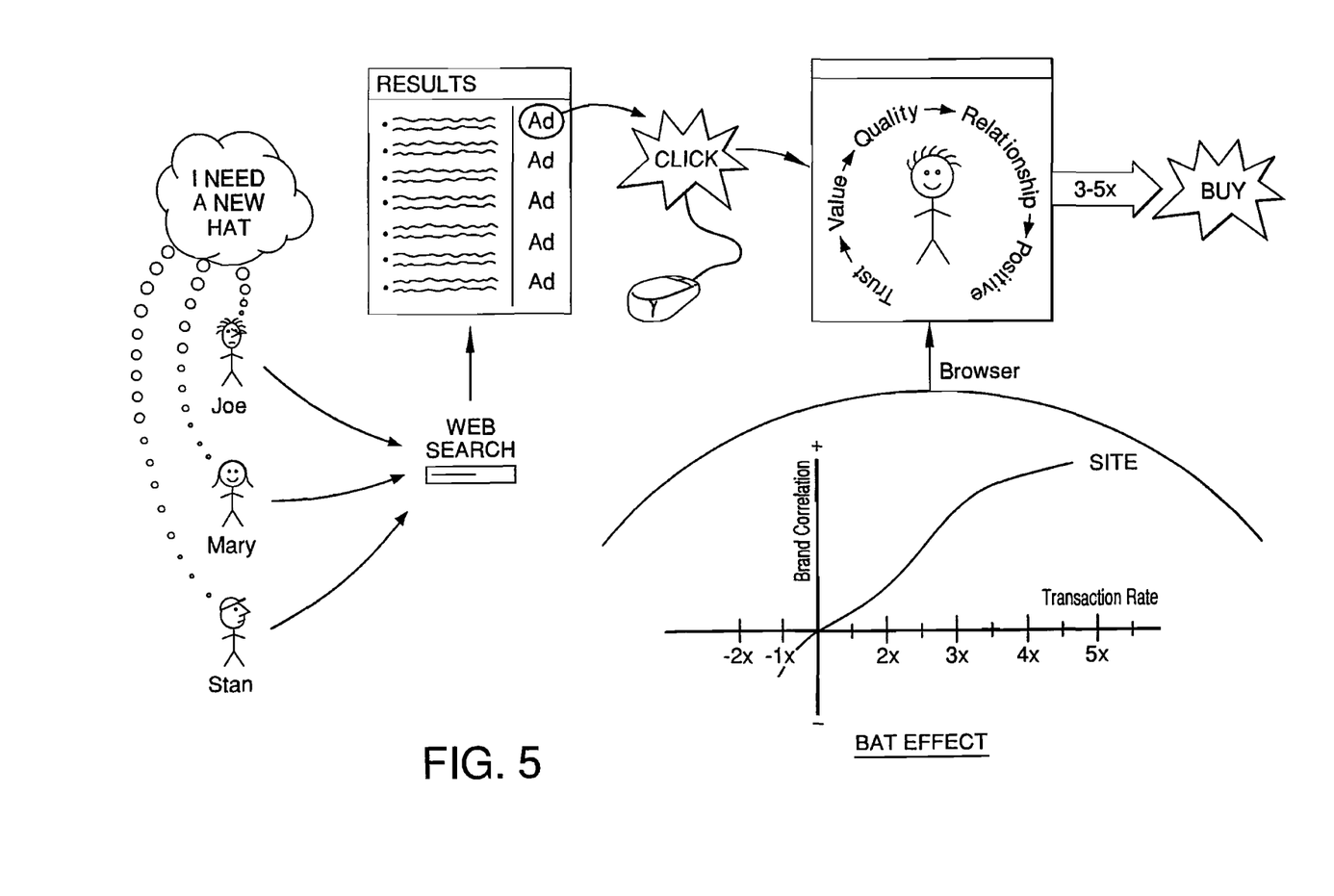
FIG. 5 illustrates an aspect of the present invention.
Figure 6:
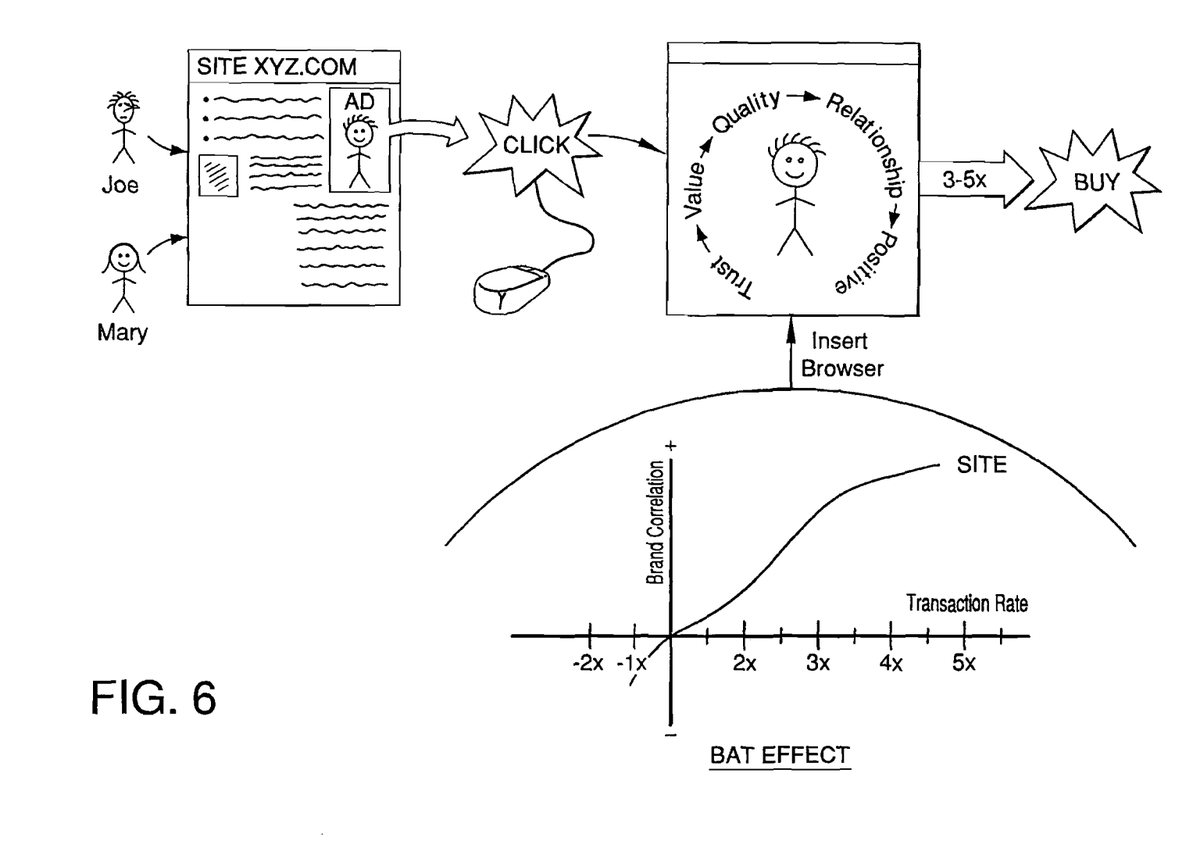
FIG. 6 illustrates an aspect of the present invention.

This effect is illustrated with respect to FIGS. 5 and 6. FIG. 5 illustrates the effect of the present invention with regard to a search advertising model, and FIG. 6 illustrates the effect of the present invention with respect to a display advertising model. In each of FIGS. 5 and 6, a brand sponsor has been selected who will indicate, to the user for whom the advertisement is deemed most relevant, trust, quality, value, a relationship to the user, and/or an overall positive feeling. The sponsor is either selected by the advertiser in the present invention for inclusion with the subject advertisement, based on the profile of a desired purchaser and the characteristics of that sponsor as they relate to that profile, which relation is set forth or suggested by the present invention, or the sponsor is selected by the present invention for inclusion in or with the subject advertiser's advertisement based on a desired responder profile for the advertisement entered by the advertiser to the engine of the present invention.

As illustrated graphically in FIGS. 5 and 6, a positive correlation of a brand sponsor to a brand, which is necessarily also a correlation of a brand sponsor to those purchasers most interested in buying the subject brand, correlates positively to a increased transaction rate. In other words, to the extent the present invention provides brand affiliations, sponsorships, and the like that are well-suited to the sponsored brand, that brand will show an increase in the number of users who are shown that advertisement and that either click that advertisement or purchase that brand through that advertisement. It is estimated that the increase in the desired response rate in accordance with the use of the present invention may typically be a 3 to 5 times increase, based on the increased positive correlation between the sponsored brand and the brand sponsor provided by the present invention, although those skilled in the art will understand that more or less improvement in the transaction rate may occur based on the implementation of the present invention.

Thus, in accordance with the present invention, and as illustrated in FIGS. 5 and 6, an increased correlation of a brand sponsor to a sponsoring brand, and thus an increased correlation of a sponsoring brand to a desired purchaser's profile, is provided. This increased correlation generates an improved transaction rate in accordance with the present invention, for at least a search advertising model and a display advertising model.

Certain embodiments of the present invention with regard to positive or negative scoring of mentions may be performed automatically, as discussed hereinthroughout or, as discussed hereinthroughout, certain embodiments of the present invention may be performed manually. Additionally, certain embodiments in the present invention may constitute the union of automatic and manual review. Such embodiments are summarized in the illustration of FIG. 7. The programmatic scoring apparatus 700 for scoring one or more mentions of one or more sponsoring brands, illustrated in FIG. 7 may include a content review window 702 to present an item to be scored to a reviewer, and a scoring input 704 by a scoring reviewer 706. The scoring apparatus may additionally include a review tracker 710 that tracks scores entered into the scoring input along with characteristics associated with the scoring input, and/or a manager's engine 720 that manages the scoring input to provide limited deviation among at least two of the scoring inputs.

In part, the reason for the variability in the embodiments of the present invention is that review and scoring rules must be strictly applied in order for the subject metrics to have maximum effect. For example, as discussed hereinthroughout, if a first manual or automatic review produces a rating of three, and a second automatic or manual review produces a rating of eight, for the same article, the variability in the scoring allows for no conclusions to be made with regard to the mention of the subject sponsoring brand. Thus, in one exemplary embodiment of the present invention, first arising mentions of particular sponsoring brands of interest may be referred to experts in the categorical field into which that sponsoring brand falls. For example, a first arising mention of an NFL quarterback being arrested for domestic violence may be referred to an expert in use of NFL players as sponsoring brands. This initial expert reviewer may be aided by certain automatic tools associated with the present invention, such as wherein the article is abstracted, highlighted, or the like to specifically target the mentions of interest to the reviewer. The subject expert then scores the mention, either positively or negatively, and the mention is then referred to other like experts in the same or similar fields. Those other experts may then also score the mention, and for each scoring expert, a tracking may be performed of the score, the variability from a typical score given by that expert, how long the mention was reviewed before the scoring occurred, who the scorer was, the experience with regard to scoring of that scorer, and a comparison of that score, along with the variability of that score, from other scores with regard to the same or similar mentions.

Thus, the present invention allows for an upper tier of expert scorers, and lower tiers of greater numbers of scorers. Needless to say, once the scorer metrics of the lower tier scorers approach those of the expert scorers, the lower tier scorers may likewise becomes experts, and greater weight will be accorded to their respective scorings.

Further, the applicable rules for scoring variability are softened in the present invention with regard to both expert and non-expert scorers in the event that very few mentions occur with regard to the subject incident being scored. For example, as discussed hereinthroughout, in the event that only two interne mentions occur of a particular sponsoring brand mistreating animals, it is quite likely that such mentions are false or mis-associated, and thus the scoring of such mentions is less important than the scoring of other more highly true mentions. Thereby, sponsoring brands receiving greater numbers of mentions with regard to certain topics are subject to more strict scoring rules with regard to scoring experts and non-experts than are brands receiving fewer mentions. Thus, for example, scoring rules may be more strict for certain topical mentions of actor Tom Cruise, or for all mentions of actor Tom Cruise, than such rules would be for a lesser known actor, or for an actor receiving significantly fewer mentions.

Figure 7:
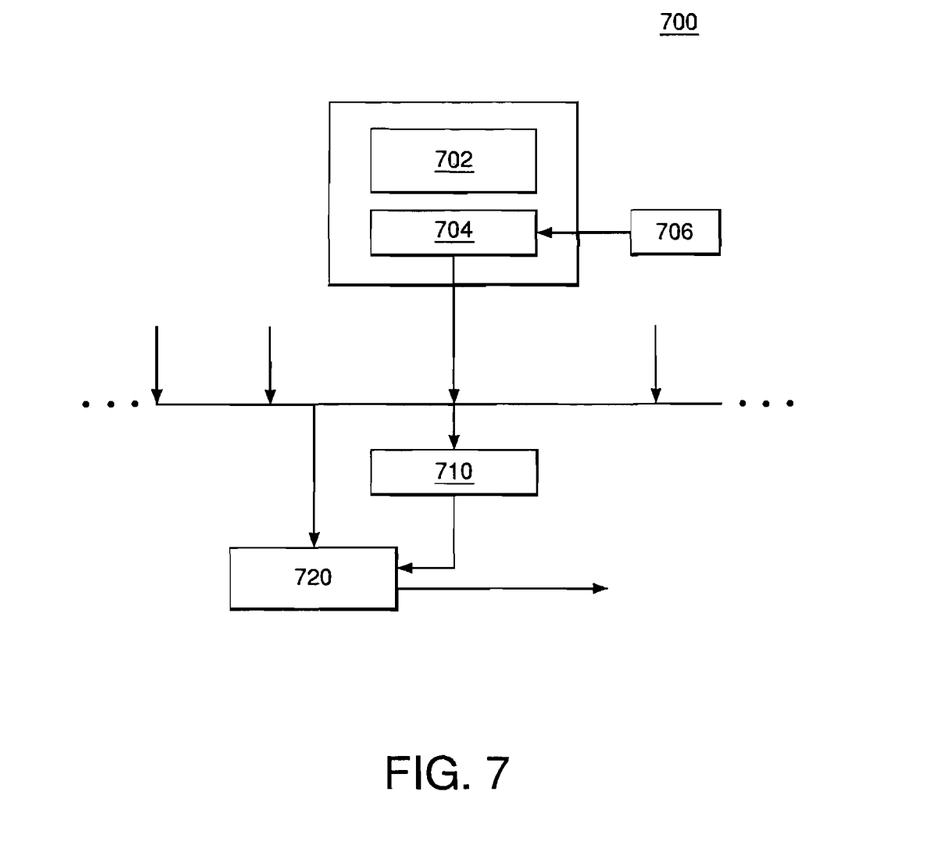
FIG. 7 illustrates an aspect of the present invention.

In accordance with the discussion immediately hereinabove, the reviewing engine of the present invention may include the review manager's engine of FIG. 7 that allows for the granting of review privileges in accordance with the present invention. More specifically, the manager's engine may allow, manually or automatically, for adjustment in the scores of certain reviewers, and/or for the changes in expertise levels of certain reviewers upon the meeting of certain review criteria. For example, the manager's engine may, interstitially or continuously, insert certain articles having certain mentions of certain sponsoring brands with regard to certain topics. The manager's engine may track the scores, timing, and the like granted by particular reviewers, and may continue to perform such training exercises until that reviewer's scorings come within an allowable deviation from an acceptable review score of such sponsoring brand, or of such mention, or in such category. Thereby, reviewers can be trained to grant scores within an acceptable deviation, scores can be changed based on information gained about the scoring reviewer, or re-scoring can continue regarding certain brands, mentions, categories, or the like, for example, until a scorer begins to grant scores within an acceptable deviation to allow that scorer to "go live."

Of course, as referenced hereinabove, sponsoring brands may be prioritized as to whether, or if, mentions of such sponsoring brands are reviewed. For example, a local, unknown actor having a total of two advertisements nationwide in which that actor is used as the sponsoring brand would merit little attention to rating mentions of that actor were that actor to rob a bank, but, in the event a more well-known actor, such as Governor Arnold Schwarzenegger, were to rob a bank, scoring would become far more important. In such an event wherein a well-known sponsoring brand received numerous surprising mentions regarding the same topic, the present invention would, as discussed hereinabove, allow for multiple article mentions to be reviewed by different people, within or without those people being in a categorically related field of expertise. In the event that the scores accorded the multiple articles were relatively standard with little deviation, the assumption may be made that the reviewers are all of expert level with regard to that category, and/or with regard to such mentions, and/or with regard to such a sponsoring brand, but if the scores are inconsistent and/or illustrate significant deviation, other avenues may be necessary. For example, in the case of such inconsistent scores, statistical analysis may be performed. For example, outlying scores may be eliminated from contribution to the total score, only scores falling within a certain standard deviation may be used in scoring, or multiple new articles regarding the same mention may be sent to the same group of people for rescoring, or may be sent to a different group of people for a new scoring in repetition until the total scoring regarding the subject mentioned is within an acceptable statistical limit. Thereby, statistical accuracy allows for improved ratings of mentions, particularly with regard to more significant sponsoring brands receiving more numerous mentions. Of course, in certain embodiments and with regard to certain mentions, the ratings may never, in fact, statistically converge, for a myriad of possible reasons.

For example, in the event that a significant actor robbed a bank because all of his or her money was stolen by an agent, and in fact the actor needed the money to care for an ill child, persons having expertise in rating mentions regarding robberies, or crimes in general, may attribute wildly different scores to the subject mention, in part because some or all of the scorers may feel that the extenuating circumstances of the crime should significantly affect the negativity, or positivity, of the subject mention. Thus, in such convoluted circumstances, scores regarding the mention may never converge, or in fact a very negative occurrence may converge on a surprisingly positive score.

In anticipation of the aforementioned eventual convergence, or non-convergence, of scoring, the frequency of scoring may vary with regard to the type of mention, the sponsoring brand of interest, the category of mention, or the like. For example, in the above referenced embodiment, in the event an actor robbed a bank, scoring of all mentions may occur repeatedly, such as eight times per day, for the first week after the occurrence. Thereafter, scoring may be performed once per day for the next week, and twice per week thereafter, for example, until the number of mentions, or the score of mentions, fall above or below a certain threshold. Thus, variability in review periods may be determined programmatically, such as by sponsoring brand, type of sponsoring brand, category of sponsoring brand, mention, type of mention, category of mention, reviewer scores deviations, numeric average reviewer score, or the like.

Of course, mentions may be tracked and flagged based on the presence of key words, such as key words constituting sponsoring brands in certain events, as discussed hereinthroughout. However, in certain events, key words may not alert reviewers that an article should be placed under review. For example, in the event a particular actor's family member has made anti-Semitic remarks, monitoring for key word mentions may not be sufficient to flag such mentions to enable review. For example, in this example, if certain keywords were subject to search, such as "Christian", "Jewish", "Father" and the actor's name as a sponsoring brand, even a mention that met all of these key words might not be flagged as having any negative connotation, in part because the key words themselves, in the abstract, do not have any negative connotation. In such cases, however, it is likely that a spike will occur in the number of mentions of the sponsoring brand. Thus, the present invention is preferably fluidic in that, even in cases where key word mentions do not force review of certain sponsoring brands, other events, such as simply spikes in the number of mentions of a sponsoring brand, may flag that sponsoring brand and those mentions for review.

It almost goes without saying that all data rated in accordance with the present invention, or certain subsets of data rated in accordance with the present invention, may be stored, such as in a relational database, in accordance with the present invention. For example, data in articles and periodicals may be reviewed via accessing RSS data feeds in accordance with the present invention, and may be rated thereby. Further, such articles and periodicals may be downloaded via those RSS data feeds, either for ratings purposes, periodically in accordance with a certain time frame, or upon occurrence of each mention of one or more nouns or proper nouns, or upon occurrence of one or more online or offline triggers, for example. Thus, in accordance with the present invention, there is no need to store particular web pages, or crawl particular web pages, as is done by, for example, prior search engines such as the Google® search engine. However, RSS feeds, and/or the content thereof, may be indexed in a manner similar to web pages, such as indexing based on certain nouns, proper nouns, or requested key words, for example. Thus, the present invention may provide, for example, all articles and periodicals available on-line via RSS data feeds, indexed by all proper nouns, categories of proper nouns, certain pre-selected nouns or key words, or categories of selected nouns or key words, for example. Further, the indexing of the present invention may allow for exclusion of certain nouns, proper nouns, or key words, from downloading, storage, ratings, review, or access, for example. Thereby, data stored in accordance with the present invention may allow for buzz tracking and/or rating of mentions not only of famous persons, for example, but additionally of hotel chains, sports teams, home appliances, or anything that can be associated with a proper noun or keyword, for example.

Needless to say, the storage of all data in association with the present invention, in conjunction with indexing of that stored data, allows for data mining through the use of the present invention. Data mining, as used herein, indicates a review of data to locate patterns, relationships, and/or information within data not evident in the data prior to the data mining, and may make use of data within one or more databases or database related applications, for example. Prior art data mining applications, in part due to the aforementioned downloading of every web page, tend to mine all data and thus generate information from the data mining that is only moderately useful. For example, certain prior art engines can provide information as to who searches for what, and where they search, in certain on-line applications. However, more detailed information, or the capability to mine for associations and buzz, particularly with regard to buzz in relation to certain categories, is unavailable in the prior art but is available through the use of the present invention.

For example, proper noun sets may segmented in accordance with the current invention for data mining. The instant invention can, in part by obtaining information regarding the number of hits on particular articles, particular web pages, or particular RSS feeds, and in conjunction with knowledge of a metric rating of an article, recognize by data mining the extent to which a particular article affects the opinions of a percentage of the population. For example, if an article mention rates at a negative 3, that is to a degree a poor mention for the subject of the article (that is, the proper noun mentioned in the article), and if that article received 8,000 hits, 25% of which hits will typically repost the article at least once, it can be projected that at least 10,000 perspective consumers will have their opinion of the proper noun mentioned in the article negatively affected to a negative degree of 3 on the subject rating scale. Similarly, certain non-proper nouns may be tracked in accordance with the present invention, and/or in conjunction with the aforementioned proper nouns, such as the terms charity, arrested, new movie, alcohol abuse, and the like. Thereby, the present invention not only provides a projection of the extent of an effect on people's opinions, and how many opinions will be effected, but also allows for an inverse data mining analysis, that is, the effect a charitable giving reference has on all celebrities with regard to which charity is mentioned.

Figure 8:
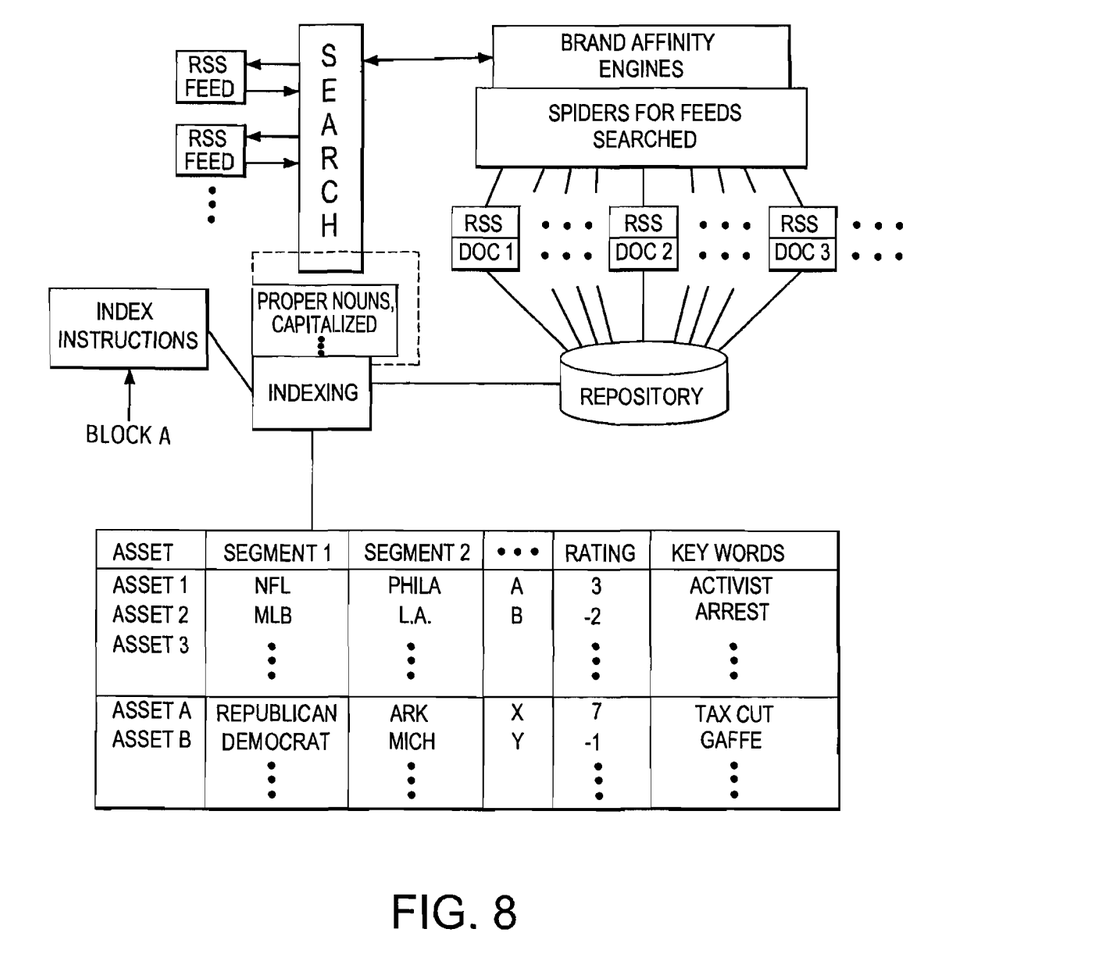
FIG. 8 illustrates an aspect of the present invention.

The storage and mining of data in accordance with the present invention is reflected in FIG. 8. FIG. 8 illustrates the key word search mechanism of the present invention, wherein searching is performed, and RSS feeds accessed and downloaded to the repository of the present invention. Additionally, FIG. 8 illustrates the storage of the RSS feeds in accordance with the present invention, along with an indexing hierarchy for use with the present invention. Such an indexing hierarchy may allow for a map reduction indexing, that is, wherein the stored data is stored in accordance with information in multiple categories, certain of which categories may be subsets of other categories. This indexing may be externally controlled, such as by entry of indexing instructions, whereby searching, indexing and storage may be performed in accordance with any indexing instructions entered to the indexing mechanism.

FIG. 8 also illustrates an engine capable of sequencing, analyzing, and/or organizing of information pursuant to entry of sequencing and/or categorization information and/or rules to Block A. This information may then be used, for example, by a search engine, as illustrated, in order to search information in accordance with entered categories and/or sequencing. However, because the present invention additionally maintains the information obtained by the search in a repository as shown, this externally entered sequencing and/or categorization information may further be employed to categorically divide, and thereby sequentially associate, information available in the repository, such as pursuant to one or more instructions entered into Block A. Thereby, the present invention may allow for the seeking out of information available electronically, be that information available locally or via a network connection, and additionally allows for an assessment of relationships between the information thus downloaded to the repository. Such relationships may be assessed, for example, in order to understand, analyze or generate data with regard to the relationships between different items of information.

In an exemplary embodiment of the present invention, information sought and obtained into the repository may relate to a variety of candidates for political office, wherein those candidates are categorized hierarchically, with one such category constituting any variation of the first or last name of that candidate, the second segment for categorization comprising the party mentioned in association with the referenced proper nouns in the first sub-category, with yet another categorization constituting political office held or sought, with yet another category comprising ratings of mentions of the candidate in one or more political blogs, articles, audiovisual media, and the like that is available electronically via the world wide web, such as in association with particular keywords, and available additional categories. Thereby, for example, by dividing and storing available information based on any several of the aforementioned plurality of categories instructed by the party entering the index information into Block A, the same rules and categories may be used to manipulate the data available in the repository obtained pursuant to the seeking of information. For example, the information available in the repository in the aforementioned political example may provide for a much more true picture of a candidate's political popularity, likelihood of winning, likelihood of winning in geographic areas, and/or popularity internationally, for example. The strength of this information as provided by the present invention, lies, of course, in the fact that the repository includes not just several news feeds, but nearly any information available making mention of the candidates, as well as the associations of those candidates and those mentions with each of the other aforementioned categories, for example.

Further, those skilled in the art will thus appreciate that the present invention makes available the ability to use the same information, that is, the information made available in the repository responsive to the seeking out of information in accordance with the categories as set forth in Block A, to manipulate, analyze and/or sequence the data to generate different information, rather than necessitating a new search be run each time different analysis or manipulation of data is desired. For example, a candidate for the presidency of the United States may wish to assess popularity within that candidate's own party, and then run a different search to assess national popularity with all voters, and may then wish to run a different search to assess popularity with voters in the state of California from all parties. The present invention would allow such assessments to be made in accordance with the rules, indexing and categories first entered into Block A, without necessity of any additional searching beyond the first search performed in accordance with the categories initially set forth at Block A.

Of course, such associations between obtained items of information and/or data may be strengthened through optimizations performed by the present invention. For example, because the present invention may be accessible to one or more networks, the performance of the present invention in relation to associating an asset with one or more information items may be fed back in the present invention, such as for comparison to actual outcomes in the above referenced political popularity example. For example, in the aforementioned presidential election example, the present invention may maintain in memory that an association was performed of all manners of mentioning proper nouns associated with one of the candidates for the office of president in conjunction with a variety of other information leading to an output, based on the information sought and downloaded to the repository, of likely percentage of the vote obtained nationally in the United States. Needless to say, following the election, this information may be compared with the actual percentage outcome of the election in the United States. Such a comparison may then constitute feedback to allow for improvements in the performance of the engines of the present invention. It almost goes without saying that, particularly in the aforementioned political example, the performance of the present invention should be greatly superior to current polling methods, in part due to the fact that the present invention will have available a much larger sampling size of polling information.

Needless to say, the political embodiment of the present invention discussed hereinabove is exemplary only. The present invention may be similarly useful in nearly any embodiment in which sequencing, numeric manipulation, data manipulation, or statistical assessment is useful. For example, the human DNA genome is currently being sequenced by a great number of national and private laboratories. The present invention, due to its categorization and sequencing of data capabilities, would be highly useful in such an embodiment. For example, not only could rules and information be entered via Block A that would allow for the sharing between all such labs of all information related to the human genome via the search and repository capabilities, but additionally the information available on the repository could be accessed, analyzed and sequenced in any desired manner once obtained, thus allowing for a unifying categorization and sequencing methodology for aspects of the human genome, as well as alleviation or total elimination of redundancies in the research process.

Thus, the present invention provides a plurality of engines that, in conjunction, can spider networked and local information, such as RSS feeds, can obtain information and download the entirety of that information to one or more repositories, and can perform any tracking or statistical or relational analysis on that downloaded information, in accordance with any information entered via Block A. Thereby, any user can control the input files to Block A of the present invention, which can act as a map reduction indexer in accordance with those user input instructions. Thus, a user of the present invention cannot only control what data is obtained, but further control how any data is mapped. Of course, it almost goes without saying that the present invention may provide templates for the use of information from Block A, such as by providing preexisting or previously requested categorizations, rules, metricizations, sequencings, and the like, but the present invention may also uniquely provide the capability for any third party to upload an independent and unique system of categorization, metricization, sequencing, statistical or relational analysis, or the like via providing open access to the capabilities of the present invention via Block A.

Although the invention has been described and pictured in an exemplary form with a certain degree of particularity, it is understood that the present disclosure of the exemplary form has been made by way of example, and that numerous changes in the details of construction and combination and arrangement of parts and steps may be made without departing from the spirit and scope of the invention.

What is claimed is:

1. An open indexing system, the system comprising:
    an indexing engine associated with at least one processor and having one or more open inputs for inputting of user-modifiable indexing criteria correspondent to at least one brand;
    at least one computerized search engine for obtaining information across at least one computing network in accordance with the indexing criteria;
    at least one repository comprising at least one computing memory for storing information obtained via said at least one computerized search engine and corresponded to the indexing criteria; and
    at least one reporting engine, wherein an output of said reporting engine is manipulable responsive to modification to one or more categorizations dependent on the indexing criteria, and wherein the output is dependent solely on the information in said at least one repository;
    wherein the at least one brand is presented to a user in at least one web page in accordance with said output of said reporting engine;
    wherein the indexing criteria comprises at least one asset and at least one segment; and wherein the indexing criteria further comprises a keyword associated with at least one of the asset and the segment.

2. The open indexing system of claim 1, further comprising a rating associated with the keyword.

3. The open indexing system of claim 2, wherein the indexing criteria comprises at least the rating.

4. The open indexing system of claim 1, wherein the information comprises at least two (Really Simple Syndication) RSS feeds.

5. The open indexing system of claim 4, wherein at least one of the at least two (Really Simple Syndication) RSS feeds comprises a document.

6. The open indexing system of claim 1, wherein the indexing criteria comprises map reduction indexing criteria.

7. The open indexing system of claim 1, wherein the indexing criteria comprises sequencing.

8. The open indexing system of claim 1, wherein the indexing criteria comprises a sequential association.

9. The open indexing system of claim 1, wherein the indexing criteria comprises a hierarchy.

10. The open indexing system of claim 1, wherein the indexing criteria comprises at least spelling variations.

11. The open indexing system of claim 1, wherein the information comprises at least two selected from blog text, article text, RSS feed text, and audiovisual media.

12. The open indexing system of claim 1, wherein the network comprises the Internet.

13. The open indexing system of claim 1, wherein the network comprises an intranet.

14. The open indexing system of claim 1, wherein the search engine comprises a web crawl.

15. The open indexing system of claim 1, wherein multiple ones of the output of said reporting engine are provided by a single search by said searching engine.

16. The open indexing system of claim 1 wherein the output of said reporting engine comprises a predictive output.

17. The open indexing system of claim 16, wherein the output of said reporting engine comprises a comparative output comparing an actual outcome to the predictive output.

* * * * *